ND Patent Number: 5,258,467
Date of Patent: Nov. 2, 1993

United States Patent [19]
Rempel et al.

[54] CATALYTIC SOLUTION HYDROGENATION OF NITRILE RUBBER

[75] Inventors: Garry L. Rempel; Neil T. McManus; Xiang-Yao Guo, all of Waterloo, Canada

[73] Assignee: Polysar Rubber Corporation, Sarnia, Canada

[21] Appl. No.: 939,239

[22] Filed: Sep. 2, 1992

[51] Int. Cl.$^5$ .................................................. C08F 8/04
[52] U.S. Cl. ...................................... 525/339; 525/338
[58] Field of Search ................................. 525/338, 339

[56] References Cited

U.S. PATENT DOCUMENTS

| | | | |
|---|---|---|---|
| 3,700,637 | 10/1972 | Finch | 260/83.3 |
| 4,384,081 | 5/1983 | Kubo et al. | 525/339 |
| 4,464,515 | 8/1984 | Rempel et al. | 525/338 |
| 4,503,196 | 3/1985 | Rempel et al. | 525/338 |
| 4,631,315 | 12/1986 | Buding et al. | 525/338 |
| 4,812,528 | 3/1989 | Rempel et al. | 525/338 |
| 4,816,525 | 3/1989 | Rempel et al. | 525/338 |
| 5,057,581 | 10/1991 | Rempel et al. | 525/338 |
| 5,075,388 | 12/1991 | Rempel et al. | 525/338 |

FOREIGN PATENT DOCUMENTS 1558491 1/1980 United Kingdom .

*Primary Examiner*—Paul R. Michl
*Assistant Examiner*—Edward Cain
*Attorney, Agent, or Firm*—Joseph C. Gil; Godfried R. Akorli

[57] ABSTRACT

An improved process is provided for the catalytic hydrogenation of nitrile rubber in solution in an organic medium using a ruthenium catalyst, the improvement being that the hydrogenation is undertaken in the presence of water and a selected organic additive whereby the molecular weight increase in the hydrogenation process is minimized and controlled.

10 Claims, No Drawings

CATALYTIC SOLUTION HYDROGENATION OF NITRILE RUBBER

FIELD OF THE INVENTION

The present invention relates to an improved process for the production of hydrogenated nitrile rubber.

BACKGROUND OF THE INVENTION

It is well known that the carbon-carbon double bonds in a nitrile rubber, the nitrile rubber being a polymer comprising a $C_4$-$C_6$ conjugated olefin and a $C_3$-$C_5$ unsaturated nitrile, can be selectively hydrogenated, without significant hydrogenation of the $C\equiv N$ bonds, by treatment of the polymer with hydrogen in the presence of selected catalysts—for example, British Patent 1,558,491; U.S. Pat. Nos. 3,700,637; 4,384,081; 4,464,515; and 4,503,196 The use of ruthenium catalysts for the hydrogenation of nitrile rubbers is described in U.S. Pat. Nos. 4,631,315; 4,816,525, 4,812,528 and 5,057,581. The use of certain additives useful in the ruthenium catalysed hydrogenation of nitrile rubbers is described in U.S. Pat. No. 5,075,388.

In the hydrogenation of nitrile rubbers, it has been found that, depending on the nature of the catalyst, the solvent used in the hydrogenation process and the reaction conditions used for the hydrogenation, the molecular weight of the hydrogenated nitrile rubber increases during the hydrogenation process. The molecular weight increase is believed to be due to an interaction between two or more polymer molecules. The molecular weight increase is particularly noticeable when certain of the ruthenium catalysts are used and the interaction between polymer molecules can be such that the hydrogenated polymer contains gelled (crosslinked) or insoluble polymer. Although a slight increase in molecular weight can be tolerated, if the molecular weight of the hydrogenated polymer is too high this causes it to be of low acceptability to the purchaser who uses it to manufacture products, such as hoses, gaskets, belts, etc.

Accordingly, the present invention is directed to an improved process for the hydrogenation of nitrile-type polymers wherein the molecular weight increase in the hydrogenation process is minimized and controlled.

SUMMARY OF THE INVENTION

The present invention provides an improved process for the production of hydrogenated nitrile rubber wherein a nitrile rubber which is a polymer comprising a conjugated $C_4$-$C_6$ diolefin and a $C_3$-$C_5$ unsaturated nitrile is hydrogenated in solution in an organic solvent in the presence of a divalent ruthenium catalyst selected from compounds of the general formula $RuXY(CO)ZL_2$ wherein X is selected from a halogen atom or a carboxylate group, Y is selected from a halogen atom, a hydrogen atom, a phenyl group, a carboxylate group or a styryl group, Z is selected from CO, pyridine, benzonitrile or no ligand and L is selected from the phosphine ligands of the general formula $PR_3$ in which R is selected from alicyclic or alkyl groups, the improvement being that the hydrogenation is undertaken in the presence of water and an organic additive, the amount of water being from about 0.5 to about 2.5 parts by weight per 100 parts by weight of said organic solvent, said organic additive being selected from the group comprising carboxylic acids of the formula Ar-COOH wherein Ar is the aromatic group $C_6H_5$ or the chlorine substituted aromatic group $C_6H_4Cl$, carboxylic acids of the formula $R^1$—COOH wherein $R^1$ is selected from Q—$(CH_2)$—$_m$ where Q is selected from hydrogen, amine, hydroxy and phenoxy and m is an integer from 1 to 6 or $R^1$ is selected from T—$C(CH_3)_2$—, T—$CH_2$—$(CH_2)_p$—, $T_2CH(CH$—$(CH_2)_p$—, $T_3C$—$(CH_2)_p$—, $CH_3$—$CHT$—$(CH_2)_{p-1}$—, $CH_3$—$(CH_2)_y$—$CH$-$T$—$(CH_2)_{p-1-y}$— or $CH_3$—$(CH_2)_{p-1}$—$CHT$— where T is fluorine or chlorine, p is 0 or an integer from 1 to 5 and y is an integer from 1 to 3, or from carboxylic acids of the formula $HOOC$-13 $(CH_2)_n$—$COOH$ where n is an integer from 1 to 4 and from cinnamic and citric acids present in an amount of from about 0.35 to about 1.5 parts by weight per 0.01 g of ruthenium in the catalyst and from chloroacetic and ascorbic acids present in an amount of from about 0.2 to about 1 parts by weight per 0.01 g of ruthenium in the catalyst and from oxalic acid present in an amount of from about 0.15 to about 0.5 parts by weight per 0.01 g of ruthenium in the catalyst.

DETAILED DESCRIPTION

The nitrile rubber hydrogenated in this invention is a polymer comprising a conjugated $C_4$-$C_6$ diolefin and a $C_3$—$C_5$ unsaturated nitrile. The conjugated $C_4$-$C_6$ diolefin is selected from butadiene, isoprene, piperylene and 2,3-dimethyl butadiene, with butadiene and isoprene being preferred and butadiene being most preferred. The conjugated diolefin forms from about 50 to about 85 percent by weight of the polymer. The $C_3$-$C_5$ unsaturated nitrile is selected from acrylonitrile, methacrylonitrile and ethacrylonitrile, with acrylonitrile being most preferred, and forms from about 15 to about 50 percent by weight of polymer. The polymer may also contain a small amount, that is from about 1 to about 10 percent by weight of the polymer, of an unsaturated carboxylic acid selected from fumaric acid, maleic acid, acrylic acid and methacrylic acid which replaces part of the conjugated diolefin and the conjugated diolefin forms from about 40 to about 84 percent by weight of the polymer. The nitrile rubber has a molecular weight, as expressed by the Mooney viscosity (ML 1+4 at 100° C.), of from about 25 to about 70. A preferred nitrile rubber is a butadiene-acrylonitrile polymer having an acrylonitrile content of from about 25 to about 45 percent by weight and having a Mooney viscosity (ML 1+4 at 100° C.) of from about 25 to about 60.

Nitrile rubber is usually prepared by aqueous emulsion free radical polymerization of the monomers, the nitrile rubber being recovered by the well known coagulation and drying procedures.

The organic solvent used in the process is one which need not be miscible with the added water but which is a solvent for the polymer and the catalyst. Suitable such solvents include chlorobenzene, dichlorobenzene, toluene and tetrahydrofuran, chlorobenzene and tetrahydrofuran being preferred. The amount of solvent that is used is such as to provide a nitrile rubber solution containing from about 3 to about 20, preferably from about 8 to about 15, weight percent of nitrile rubber.

Hydrogen is provided as essentially pure dry gas at a pressure of from about 18 kg/cm² (about 250 psi), preferably from about 40 kg/cm² (about 570 psi), to about 100 kg/cm² (1420 psi).

The hydrogenation reaction is undertaken in a suitable reaction vessel equipped with a temperature regulating means, a catalyst addition means and an agitator. The nitrile rubber solution is added to the reaction vessel, water may be added and then the organic additive or preferably the organic additive is dissolved in water and added, any necessary degassing is undertaken, and either the catalyst is added followed by pressurizing with hydrogen or the vessel is pressurized with hydrogen and the catalyst is added to the catalyst addition means. The catalyst may be added as the solid material or as a solution in an appropriate solvent. The exact order of addition is not critical. The reactor is heated to the desired temperature following which the hydrogen pressure is brought to the desired level. The temperature for the hydrogenation is from about 80° to about 200° C., preferably from about 120° C. to about 180° C. Hydrogen may be added to the reactor during the hydrogenation and the reaction is complete within about 2 to about 24 hours, although when the preferred catalysts are used the reaction time is generally from about 2 to about 8 hours. The degree of hydrogenation may be controlled by control of one or more of the reaction time, temperature or hydrogen pressure, preferably reaction time. On completion of the reaction, the reaction vessel is vented and the polymer recovered by contact with hot water/steam or an alcohol followed by drying.

The divalent ruthenium catalyst used in the process is selected from compounds of the general formula $RuXY(CO)ZL_2$ wherein X is selected from a halogen atom or a carboxylate group, preferably is a halogen atom and most preferably is chlorine; Y is selected from a halogen atom, a hydrogen atom, a phenyl group, a carboxylate group or a styryl group, preferably is a chlorine atom, a hydrogen atom or a styryl group and most preferably is a hydrogen atom or a styryl group; Z is selected from CO, pyridine, benzonitrile or no ligand and preferably is no ligand; L is selected from phosphine ligands of the general formula $PR_3$ wherein R is selected from alicyclic or alkyl groups. A preferred alicyclic group is cyclohexyl. The alkyl group is preferably selected from isopropyl and secondary butyl and from tertiary butyl when combined with a smaller alkyl group. Preferably R is cyclohexyl.

Specific examples of suitable divalent ruthenium catalysts include carbonylchlorohydrido bis (tricyclohexylphosphine) ruthenium (II), carbonylchloro styryl bis(tricyclohexylphosphine) ruthenium (II), carbonylchlorostyryl bis(tri-isopropylphosphine) ruthenium (II) and carbonylchlorohydrido bis (tri-isopropylphosphine) ruthenium (II).

The concentration of the ruthenium catalyst is not critical and usually is within the range of from about 0.015 to about 2 percent by weight of the nitrile rubber. For economic reasons it is desirable to minimize the concentration of the ruthenium catalyst and accordingly it is preferably used within the range of from about 0.015 to about 0.15 percent by weight of the nitrile rubber.

The improved process of this invention requires the presence, during the hydrogenation, of both water and an organic additive. It has been found that while water alone will influence the reaction a more desirable effect is achieved when both of water and the organic additive are present. The amount of water added is from about 0.5 to about 2.5 parts by weight per 100 parts by weight of the organic solvent. Preferably the amount of water is from about 0.75 to about 1.5 parts by weight per 100 parts by weight of the organic solvent. The organic additive is selected from the group comprising carboxylic acids of the formula Ar—COOH wherein Ar is the aromatic group $C_6H_5$ or the chlorine substituted aromatic group $C_6H_4Cl$, for example benzoic and chlorobenzoic acids, from carboxylic acids of the formula $R^1$—COOH wherein $R^1$ is selected from Q—$(CH_2)_m$— where Q is selected from hydrogen, amine, hydroxy and phenoxy and m is an integer from 1 to 6, for example acetic acid, propionic acid, butyric acid, glycolic acid, glycine and phenoxyacetic acid, or $R^1$ is selected from T—$C(CH_3)_2$—, T—$CH_2$—$(CH_2)_p$—, $T_2CH$—$(CH_2)_p$—, $T_3C$—$(CH_2)_p$—, $CH_3$—CHT—$(CH_2)_{p-1}$—, $CH_3$—$(CH_2)_y$—CHT—$(CH_2)_{p-1-y}$— or $CH_3$—$(CH_2)_{p-1}$—CHT where T is fluorine or chlorine, p is 0 or an integer from 1 to 5 and y is an integer from 1 to 3 for example chloroacetic, trichloroacetic, 3-chloropropionic and 5-chlorovaleric acids, or from carboxylic acids of the formula HOOC—$(CH_2)_n$—COOH where n is an integer from 1 to 4, for example malonic acid, succinic acid and adipic acid and from cinnamic acid, ascorbic acid and citric acid, all of the aforesaid acids being present in an amount of from about 0.3 to about 1.5, preferably from about 0.5 to about 1.25, parts by weight per 0.01 g of ruthenium in the catalyst and from chloroacetic acid and ascorbic acid present in an amount of from about 0.2 to about 1, preferably from about 0.2 to about 0.75, parts by weight per 0.01 g of ruthenium in the catalyst and from oxalic acid present in an amount of from about 0.15 to about 0.5 parts by weight per 0.01 g of ruthenium in the catalyst. When the additive is not present in the reaction, the molecular weight of the hydrogenated nitrile rubber (as measured by the Mooney viscosity or the intrinsic viscosity) will have significantly increased or the hydrogenated nitrile rubber is crosslinked. Preferred additives include chloroacetic acid, oxalic acid, adipic acid and ascorbic acid. The molecular weight may be measured in terms of the Mooney viscosity determined at 100° C. (ML 1+4 at 100° C.) or at 125° C. (ML 1+4 at 125° C.) or as the intrinsic viscosity determined at 35° C. in monochlorobenzene.

The following examples illustrate the scope of the invention and are not intended to limit the same.

EXAMPLES

Example 1

Using a 300 ml stainless steel autoclave fitted with a glass liner, an agitator, temperature control means, catalyst addition means and sampling means, hydrogenation of nitrile rubber was undertaken using a variety of additives. The nitrile rubber was a butadiene-acrylonitrile polymer containing about 38 weight percent of acrylonitrile and about 62 weight percent of butadiene and had a Mooney viscosity (ML 1+4 at 100° C.) of about 50 and was used as a 12 percent solution in chlorobenzene. The catalyst was carbonylchlorohydrido bis (tricyclohexylphosphine) ruthenium (II), used at a concentration of 500 ppm by weight based on the weight of nitrile rubber, the reaction temperature was 145° C. and the hydrogen pressure was 1200 psi, all the details being shown in Table 1. Except for Experiments #6 and 7, the additive was dissolved in 1 ml of water and this solution was added to the nitrile rubber solution and for Experiments #6 and 7 the additive and the water (1 ml) were added separately to the rubber solution. The nitrile rubber solution and additive solution in water (or separately) were added to the autoclave, the catalyst was added to the catalyst addition means and the autoclave was sealed and flushed with hydrogen. The temperature was increased to that required, then the hydrogen pressure was increased to that required and the catalyst was transferred from the catalyst addition means to the reaction mixture to initiate reaction. Hydrogen was added, as necessary, to maintain the hydrogen pressure during the reaction. On completion of the reaction, the reactor was cooled, vented and the reaction product recovered and dried. The extent of hydrogenation was determined by I.R. spectroscopy and the intrinsic viscosity was measured using chlorobenzene at 35° C. in an Ubbelohde viscometer. In Table 1, Additive A is acetic acid, Additive B is propionic acid, Additive C is glycolic acid, Additive D is chloroacetic acid, Additive E is adipic acid, Additive F is phenoxyacetic acid, Additive G is glycine, Additive D-1 is trichloroacetic acid, Additive D-2 is 3-chloropropionic acid and Additive D-3 is 5-chlorovaleric acid. In Experiment #10, the additive was added as a solution in 2 ml of water. Experiment #1 is a control with neither water nor an additive present and the very high intrinsic viscosity is obvious. Experiment #9 is a control with only water present and the medium high intrinsic viscosity is seen.

EXAMPLE 2

Using the same procedure as described in Example 1, further additives were evaluated as shown in Table 2. In Experiments #3, 4 and 5, the water (1 ml) and the additives were added separately to the nitrile rubber solution and for the remaining experiments the additive was dissolved in 1 ml of water and this solution was added to the rubber solution. In Table 2, Additive H is oxalic acid, Additive I is succinic acid, Additive J is benzoic acid, Additive K is chlorobenzoic acid, Additive L is cinnamic acid, Additive M is ascorbic acid and Additive N is citric acid.

TABLE 1

| EXPT # | ADDITIVE | ADD. CONC (g) | ADD/ 0.01 g RU | REACT. TIME (hr) | HYDROG. % | INT. VISC dl/g |
| --- | --- | --- | --- | --- | --- | --- |
| 1 | — | — | — | 4.5 | 99.7 | 2.05 |
| 2 | A | 0.035 | 0.37 | 2.5 | 99.8 | 1.76 |
| 3 | B | 0.040 | 0.42 | 3.5 | 99.4 | 1.78 |
| 4 | C | 0.042 | 0.44 | 4 | 99.5 | 1.54 |
| 5 | D | 0.052 | 0.55 | 2.5 | 99 | 1.54 |
| 6 | E | 0.089 | 0.94 | 2.5 | 99.8 | 1.61 |
| 7 | F | 0.085 | 0.89 | 6.5 | 99.5 | 1.67 |
| 8 | G | 0.043 | 0.45 | 12 | 99.7 | 1.61 |
| 9 | $H_2O$ | 1 | 10.5 | 2.5 | 99.8 | 1.87 |
| 10 | D | 0.048 | 0.5 | 2.5 | 99.7 | 1.56 |
| 11 | D-1 | 0.033 | 0.35 | 2.5 | 99.7 | 1.62 |
| 12 | D-2 | 0.06 | 0.63 | 2.5 | 99.8 | 1.64 |
| 13 | D-3 | 0.08 | 0.84 | 2.5 | 99.8 | 1.75 |

TABLE 2

| EXPT # | ADDITIVE | ADD. CONC (g) | ADD/ 0.01 g RU | REACT. TIME (hr) | HYDROG. % | INT. VISC dl/g |
| --- | --- | --- | --- | --- | --- | --- |
| 1 | H | 0.016 | 0.17 | 4 | 99.8 | 1.58 |
| 2 | I | 0.065 | 0.68 | 3 | 99.6 | 1.55 |
| 3 | J | 0.070 | 0.74 | 3.5 | 99.4 | 1.67 |
| 4 | K | 0.084 | 0.88 | 2.5 | 99.8 | 1.77 |
| 5 | L | 0.085 | 0.84 | 2.5 | 99.5 | 1.78 |
| 6 | M | 0.1 | 1.05 | 2.5 | 99.7 | 1.55 |
| 7 | N | 0.1 | 1.05 | 2.5 | 99.5 | 1.61 |

EXAMPLE 3 (Control)

The procedure as described in Example 1 was used to evaluate catalysts outside the scope of the invention in the presence and absence of water and water plus additive. The data are provided in Table 3 in which Catalyst A is carbonylchloro benzoato bis (triphenylphosphine) ruthenium (II), Catalyst B is carbonylchlorohydrido tris (triphenylphosphine) ruthenium (II) and Catalyst C is dichloro tris(triphenylphosphine) ruthenium (II). The catalyst concentration was 20 ppm of ruthenium for all experiments. The nitrile rubber was the same as that used in Example 1 and 3.25 g of rubber in 90 ml of chlorobenzene was used. Hydrogen pressure was 1200 psi and the reaction temperature was 145° C. The additive was 0.05 g of chloroacetic acid dissolved in 1 ml of water. In all cases, the product in the autoclave was crosslinked (Experiment #1) or the product crosslinked during recovery.

EXAMPLE 4

The procedure as described in Example 1 was used to test additional catalysts. Catalyst D was carbonylchloro styryl bis(tricyclohexylphosphino) ruthenium (II) and Catalyst E was carbonylchloro styryl bis (tri isopropyl phosphine) ruthenium (II) and the organic additive was chloroacetic acid added as a solution in 1 ml of water.

TABLE 3

| EXPT # | 1 | 2 | 3 | 4 | 5 |
| --- | --- | --- | --- | --- | --- |
| Catalyst Type | A | A | A | B | C |
| Catalyst Wt. (g) | 0.016 | 0.016 | 0.016 | 0.02 | 0.02 |
| Water Wt. (g) | 0 | 1 | 1 | 1 | 1 |
| Additive Wt. (g) | 0 | 0 | 0.052 | 0.05 | 0.05 |
| Add/0.01 g Ru | — | — | 0.25 | 0.23 | 0.25 |
| Reaction Time (hr) | 1 | 1 | 3 | 4 | 2 |
| Hydrogenation (%) | — | 83 | 97.4 | 99.7 | 70 |

The results are shown in Table 4.

EXAMPLE 5

The procedure of Example 1 was used except that tetrahydrofuran was used as the solvent instead of chlorobenzene. The additive used was chloroacetic acid which was dissolved in 1 ml of water. In Table 5, Experiment #1 is a control with no water or additive used and the resultant intrinsic viscosity is very high whereas Experiment #2, with both water and additive present, shows the much reduced intrinsic viscosity.

TABLE 4

| EXPERIMENT # | 1 | 2 |
|---|---|---|
| Catalyst Type | D | E |
| Water Wt. (g) | 1 | 1 |
| Additive Wt. (g) | 0.05 | 0.05 |
| Add/0.01 g Ru | 0.52 | 0.52 |
| Reaction Time (hr) | 2.5 | 3 |
| Hydrogenation (%) | 99.7 | 99.8 |
| Intrinsic Viscosity (dl/g) | 1.59 | 1.62 |

TABLE 5

| EXPERIMENT # | 1 | 2 |
|---|---|---|
| Additive Wt. (g) | 0 | 0.05 |
| Add/0.01 g Ru | 0 | 0.52 |
| Reaction Time (hr) | 3 | 3 |
| Hydrogenation (%) | 99.3 | 99.5 |
| Intrinsic Viscosity (dl/g) | 1.92 | 1.63 |

We claim:

1. An improved process for the production of a hydrogenated nitrile rubber wherein a nitrile rubber which is a polymer comprising a conjugated $C_4$-$C_6$ diolefin and a $C_3$-$C_5$ unsaturated nitrile is hydrogenated in solution in an organic solvent in the presence of a divalent ruthenium catalyst selected from compounds of the general formula $RuXY(CO))ZL_2$ wherein X is selected from a halogen atom or a carboxylate group, Y is selected from a halogen atom, a hydrogen atom, a phenyl group, a carboxylate group or a styryl group, Z is selected from CO, pyridine, benzonitrile, or no ligand and L is selected from the phosphine ligands of the general formula $PR_3$ in which R is selected from alicyclic or alkyl groups, the improvement being that the hydrogenation is undertaken in the presence of water and an organic additive, the amount of water being from about 0.5 to about 2.5 parts by weight per 100 parts by weight of said organic solvent, said organic additive being selected from the group comprising carboxylic acids of the formula Ar—COOH wherein Ar is the aromatic group $C_6H_5$ or the chlorine substituted aromatic group $C_6H_4Cl$, carboxylic acids of the formula $R^1$—COOH wherein $R^1$ is selected from Q—$(CH_2)_m$— where Q is selected from hydrogen, amine, hydroxy and phenoxy and m is an integer from 1 to 6, or $R^1$ is selected from T—$C(CH_3)_2$—, T—$CH_2$—$(CH_2)_p$—, $T_2CH$—$(CH_2)_p$—, $T_3C$—$(CH_2)_p$—, $CH_3$—CHT—$(CH_2)_{p-1}$—, $CH_3$—$(CH_2)_y$—CHT—$(CH_2)_{p-1-y}$— or $CH_3$—$(CH_2)_{p-1}$—CHT — where T is fluorine or chlorine, p is 0 or an integer from 1 to 5 and y is an integer from 1 to 3, or from carboxylic acids of the formula HOOC—$(CH_2)_n$—COOH where n is an integer from 1 to 4 and from cinnamic and citric acids present in an amount of from about 0.35 to about 1.5 parts by weight per 0.01 g of ruthenium in the catalyst and from chloroacetic and ascorbic acids present in an amount of from about 0.2 to about 1 parts by weight per 0.01 g of ruthenium in the catalyst and from oxalic acid present in an amount of from about 0.15 to about 0.5 parts by weight per 0.1 g of ruthenium in the catalyst.

2. The process of claim 1 wherein the nitrile rubber is a polymer comprising from about 50 to about 85 percent by weight of butadiene and from about 15 to about 50 percent by weight of acrylonitrile and the nitrile rubber solution contains from about 3 to about 20 weight percent of said nitrile rubber.

3. The process of claim 2 wherein the concentration of the ruthenium catalyst is from about 0.015 to about 2 percent by weight of the nitrile rubber, the hydrogenation temperature is from about 80° to about 200° C., the hydrogen pressure is from about 18 to about 100 kg/cm² and the hydroqenation reaction takes from about 2 to about 24 hours.

4. The process of claim 1 wherein the organic additive is a carboxylic acid of formula $R^1$—COOH selected from acetic acid, propionic acid, butyric acid, glycine, glycolic acid and phenoxyacetic acid.

5. The process of claim 1 wherein the organic additive is selected from cinnamic acid and citric acid and from a carboxylic acid of formula HOOC—$(CH_2)_n$—COOH selected from malonic, succinic and adipic acids.

6. The process of claim 1 wherein the organic additive is selected from chloroacetic and ascorbic acids.

7. The process of claim 1 wherein the organic solvent is chlorobenzene.

8. The process of claim 1 wherein the organic solvent is tetrahydrofuran.

9. The process of claim 2 wherein the nitrile rubber solution contains from about 8 to about 15 weight percent of nitrile rubber, the concentration of the ruthenium catalyst is from about 0.015 to about 0.15 percent by weight of the nitrile rubber, the hydrogenation temperature is from about 120° to about 180° C., the hydrogen pressure is from about 40 to about 100 kg/cm² and the organic additive is selected from chloroacetic acid, adipic acid and ascorbic acid.

10. The process of claim 9 wherein the catalyst is selected from carbonylchlorohydrido bis(tricyclohexylphosphine) ruthenium (II), carbonylchloro styryl bis(tricyclohexylphosphine) ruthenium (II), carbonylchlorostyryl bis(tri-isopropylphosphine) ruthenium (II) and carbonylchlorohydrido bis(tri-isopropylphosphine) ruthenium (II).

* * * * *